United States Patent [19]
Rasmussen

[11] Patent Number: 6,145,920
[45] Date of Patent: Nov. 14, 2000

[54] REINFORCED FRONT ANCHOR DEVICE FOR ATTACHING AN OBJECT TO A TRUCK

[75] Inventor: C. Martin Rasmussen, Fruit Heights, Utah

[73] Assignee: Happijac Corporation, Kaysville, Utah

[21] Appl. No.: 09/088,321

[22] Filed: Jun. 1, 1998

Related U.S. Application Data

[60] Provisional application No. 60/048,546, Jun. 3, 1997.

[51] Int. Cl.$^7$ .................................................. B60P 3/377
[52] U.S. Cl. ................................................ 296/167; 410/101
[58] Field of Search ........................... 296/167; 410/100, 410/101

[56] References Cited

U.S. PATENT DOCUMENTS

| | | | |
|---|---|---|---|
| 3,368,785 | 2/1968 | Weiler | 167/167 |
| 3,706,469 | 12/1972 | Covert | 296/167 |
| 3,719,382 | 3/1973 | Palm | 296/167 |
| 3,792,900 | 2/1974 | Bugh | 296/167 |
| 3,814,460 | 6/1974 | Norrish | 296/35.3 |

*Primary Examiner*—D. Glenn Dayoan
*Assistant Examiner*—Patricia Engle
*Attorney, Agent, or Firm*—Workman, Nydegger & Seeley

[57] ABSTRACT

An anchor device for securing a camper in a bed of a truck is that includes a bracket that is configured to be mounted below the horizontal planar level of the bed of the truck and to stably retain the camper in the bed of the truck while limiting the rotational, horizontal and vertical movement of the camper. The bracket comprises a first arm and a second arm that are connected by a corner portion so as to have a generally elbow-shaped profile and a cross member that provides strength and rigidity to the bracket. The cross member has an outside surface and is attached to the first arm and the second arm such that the cross member and the edges of the first arm and said second arm are substantially parallel. The first arm, the second arm, and the cross member are configured to be mounted on three surfaces of the truck so as to limit any rotational, horizontal and vertical movement of the camper. The truck has a cross frame and a truck skin and either the first arm or the second arm of the bracket is attached to said truck skin. The other of the first arm or the second arm of the bracket is attached to either the cross frame or the bottom surface of the bed of the truck. The anchor device includes a tie-down assembly and a connecting assembly that are configured to cooperate.

25 Claims, 3 Drawing Sheets

REINFORCED FRONT ANCHOR DEVICE FOR ATTACHING AN OBJECT TO A TRUCK

RELATED APPLICATIONS

The benefit of the earlier filing date of U.S. Provisional Patent Application Serial No. 60/048,546, filed Jun. 3, 1997, is claimed for this application under 35 U.S.C. § 119(e).

BACKGROUND OF THE INVENTION

1. The Field of the Invention

The present invention generally relates to a device for attaching objects within the bed of a truck, and, more specifically, to an anchor device for securing a camper within a bed of a truck.

2. The Relevant Technology

Throughout the ages, man has desired to travel, to search the world, and in some instances conquer. During man's travels, however, there has been a need to have shelter to protect themselves from the ravages of the weather. At the earliest time, man has carried shelter with them, usually in the form of a tent or the like. Many times carrying the tent themselves, but also tieing the tent and other supplies to a pack animal, whether horse, mule or, in more exotic areas, camels or llamas, through the use of rope, vines etc. With advances in technology, the shelters and pack animals have changed but there remains a need to tie one to another.

Currently, many travelers, especially sports enthusiasts, use a combination of a pick-up truck and a camper to provide transportation and shelter. Camper bodies of the type that are mountable on truck beds are commonly known. Typically, the camper is secured within the bed of a truck by tie down assemblies comprising a turnbuckle, or similar device, attached to the camper. The tie down assemblies are usually positioned near each corner of the camper and are used to secure the camper within the bed of a truck. Four tie down assemblies are required because as the pick-up truck travels along a road, wind and/or road motion act to urge the camper away from the bed of a truck. The wind and/or road motion apply significant torque and force moments to the tie down assemblies and their associated anchors. As a result, four tie down assemblies are needed to securely contain the camper within the bed of a truck.

Various implementations of tie down assemblies are known. For example, a tie down assembly, having an anchor member, to be secured to the bed of a truck, and a selectively removable, self-tensioning bracket member for coupling with a turnbuckle attached to the camper, is available. The bracket member is rotatable upon the anchor member and can be removed in one predetermined position but cannot become detached when a tensioning force is being applied through the turnbuckle. This solves the problem of reducing the effects of torque and force moments on the tie assembly. However, it is also important that the tie assembly be securely anchored to the body of the truck, specifically to one or more of the load bearing members of the truck.

For many years, almost all pick-up truck models have been designed to have a substantially rectangular-shaped bed that has relatively square corners throughout, and a truck cab that has a rear wall generally parallel to the front wall of the truck bed. The rear wall of the cab is usually separated from the front wall of the truck bed. In these trucks, the two front end tie down assemblies are typically anchored near each side of the front wall of the bed of a truck. The anchor device for the front and rear tie down assemblies usually comprises a substantially flat plate with a number of threaded hole therethrough. The plate is positioned between rear wall of the cab and the front wall of the truck bed and extends a short distance beyond the side of the truck bed. A number of bolts are passed through the front wall of the truck bed and are mated with the threaded holes in the plate. The extension of the plate beyond the sides of the truck bed allows a turnbuckle or similar device to be attached thereto, and hence a camper may be connected to the bed of a truck. The rear end tie down assemblies are typically anchored at each side wall of the bed of a truck near the tailgate or at each side of the rear bumper. These type of anchor devices provide some horizontal and vertical securing of the tie down assembly. In addition, these conventional anchors are designed such that they may be used interchangeably on both sides of the bed of a truck, thereby making it easier to manufacture and install.

Another anchoring device uses a hanger type member which clips over the truck bed side walls and/or connect into a preformed hole in the side wall. The anchor device extends, at one end, away from the truck bed side wall to allow the camper to be attached, while at the other end, it extends into the bed of a truck, such that when the camper is positioned in the bed of a truck, the camper rests on the anchor device. The above hanger anchor may be modified such that it also connects with the preformed hole in the side wall, thereby providing additional support to the hanger. The preformed holes are traditionally located at the four corners of the bed of a truck. Hanger anchors of this type have a number of problems.

Recently, some manufacturers of a large number of pick-up trucks sold in the United States, introduced pick-up trucks which have a substantially different design of a truck bed. In this new design, the side walls do not meet the front wall of the truck bed in a squarish corner, but rather, the side walls curvingly extend beyond the connection with the truck bed front wall for a few inches. Through this modification of the cab and the bed, the narrow gap between the truck cab and the truck bed front wall has a curved form.

With a modified pick-up truck, for example those made by the Ford Motor Co., a number of problems occur when trying to attach a camper in the bed of the truck. Although conventional anchor devices for camper tie down assemblies are usable for the rear end tie down assemblies, conventional anchor devices may not be secured to the front wall of the truck bed. When the conventional anchor is bolted to the front wall of the truck bed, the anchor device normally lies along the plane of the front wall. However, with the modified bed the front wall is curved, and hence the flat plate cannot be securely connected to the front wall. In addition, the conventional anchor cannot extend beyond the side of the truck because the side walls have been modified to extend beyond the traditional connection with the truck bed front wall and encloses the rear of the cab.

Furthermore, the traditional front wall anchor is only connected to one surface, the front wall. Therefore, the anchor does not provide additional protection against movement in the longitudinal direction of the bed of a truck, nor for rotational movement of the camper located within the bed of a truck.

A hanger type device may be used as a front end tie down anchor, however they do not provide, similar to a conventional anchor, increased protection for torque and force moments through a reduction of horizontal, vertical and rotational movement of the anchor. In addition, the hanger type anchors do not give sufficient protection against excessive damage to the painted finishes of the side walls of the bed when installed and in use.

It would be an advance to provide anchor devices for securing an object, such as a camper, within a bed of a truck that is safe, secure, and easily accessible, while reducing the horizontal, vertical and rotational movement of the object. In particular, it would be an advance to provide such anchor devices for use in trucks where the bed has curved intersections and/or side walls curvingly extend beyond the connection with the front wall of the truck bed. In addition, it would be an advance to provide an anchor device for use in trucks where there is limited access to the narrow gap between the truck cab and the front wall of the bed.

OBJECTS AND BRIEF SUMMARY OF THE INVENTION

It is an object of the present invention to provide an anchor device for securing a camper in the bed of a truck that has sufficient strength to reduce horizontal, vertical and rotational movement of the camper in the bed of a truck.

Another object of the present invention is to provide an anchor device for securing a camper within a bed of a truck that is adapted to be attached near the front of a bed of a truck.

Another object of the present invention is to provide an anchor device that can be used even on the redesigned trucks with the rounded truck beds.

Yet another object of the present invention to provide an anchor device which is symmetrical and thus can be used on either side of the truck bed.

An additional object of the present invention is to provide an anchoring device which will allow campers to be coupled to a bed of a truck where there is limited access to the gap between the truck bed front wall and the cab.

It is another object of the present invention to provide such an anchor device that is reinforced to be very secure and accessible.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an anchor device for securing a camper in a bed of a truck is provided that comprises a bracket, a connecting assembly to couple the bracket to the truck, and a tie-down assembly to interconnect the camper with the bracket. The bracket is configured to be mounted below the horizontal planar level of the bed of the truck and to stably retain the camper in the bed of the truck while limiting the rotational, horizontal and vertical movement of the camper. The connecting assembly comprises at least a bolt. The bracket comprises a first arm and a second arm that are connected by a corner portion so as to have a generally elbow-shaped profile. The bracket also includes a cross member that provides strength and rigidity to the bracket and has an outside surface. The cross member is attached to the first arm and the second arm such that the cross member is substantially parallel with the outer edges of the first and second arms. The first arm, the second arm, and the cross member are configured to be mounted on three surfaces of the truck so as to limit any rotational, horizontal and vertical movement of the camper. Either the first arm or the second arm of the bracket is attached to the skin and is configured to receive the bolt therethrough. The other of either the first arm or the second arm of the bracket is attached to one of either the cross frame or the bottom surface of the bed of the truck.

The tie-down assembly includes an elongated turnbuckle and an attachment piece. The turnbuckle has a first end attached to the camper and a second end that is connected to the attachment piece. The attachment piece is configured to cooperate with the bolt to interconnect the camper and the bracket.

It will be appreciated that the anchor device of the present invention can be used beneath the bed of any truck where it is possible to attach the device in a similar manner as that described above. In particular, the anchor device fits pick-up trucks with a bed of a truck having truck bed side walls that do not meet the front wall in a squarish corner but, rather, are curvingly extended forward beyond the junction with the front wall, such as the 1997 Model Ford F-150 and F-250 (under 8,500 GVW) trucks.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention is related to an anchor device which may be used to secure an object in the bed of a truck, and more specifically to anchor a camper in a bed of a truck. The anchor device is configured to resist rotational movement and to have significant strength to securely anchor the camper to the bed of a truck. Therefore, the anchor device is capable of preventing horizontal, vertical and rotational movement of an object, such as a camper that is attached to a truck, while being configured such that one design of the anchoring device may be used, interchangeably, on either side of the truck.

Figure 1:
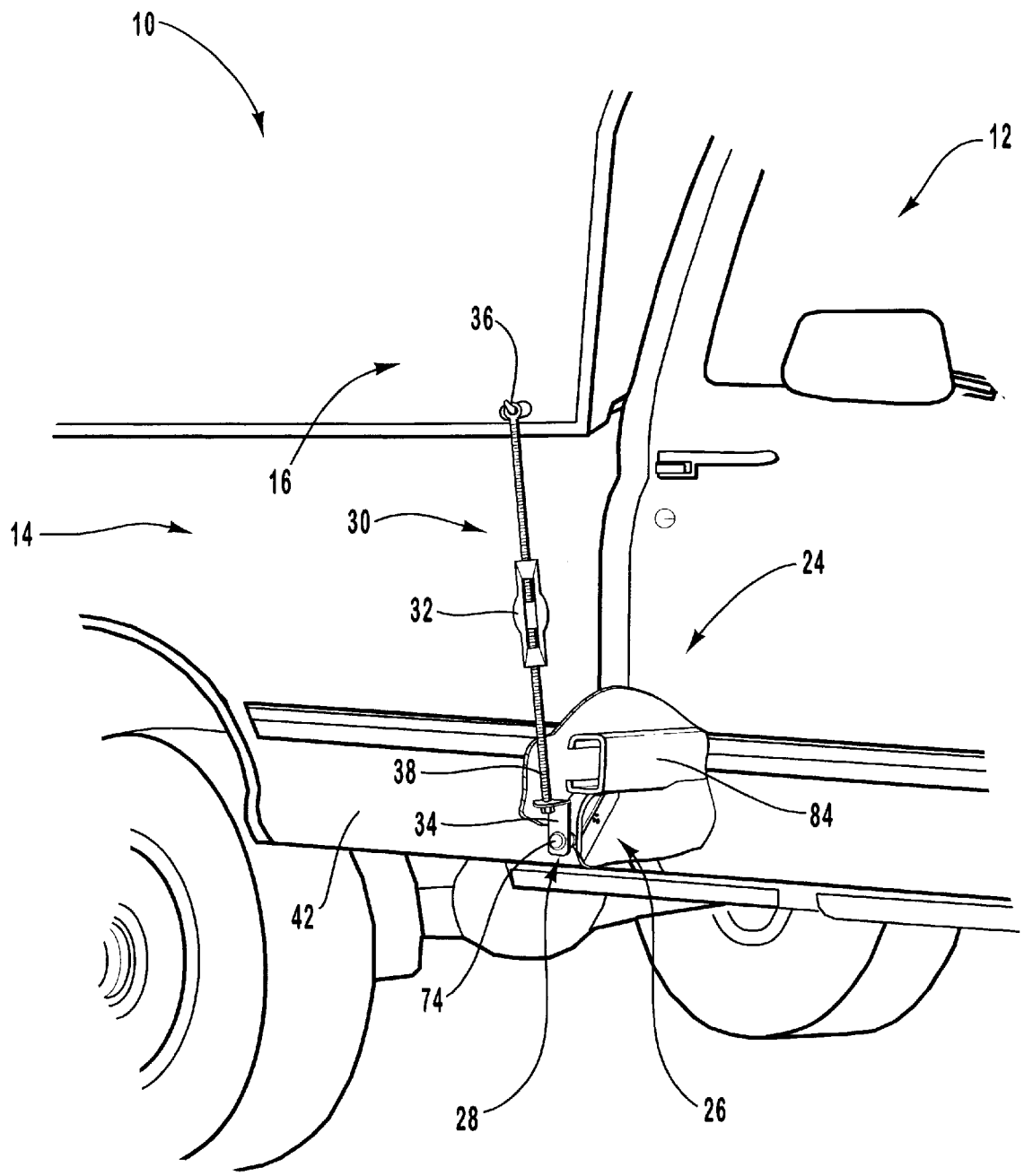
FIG. 1 is a perspective view of one embodiment of an anchor device.

FIG. 1 depicts a truck 10 with a cab 12 and a truck bed 14 that supports a camper 16. As shown generally in FIG. 1, an anchor device, such as anchor device 24, is used to securely hold camper 16 in truck bed 14. Generally speaking, anchor device 24 includes a bracket 26 and a connecting assembly 28 that will be discussed in further detail below.

According to one aspect of the present invention, anchor device 24 also comprises a tie-down means for interconnecting camper 16 with bracket 26. Structure capable of performing the function of such a tie-down means, as shown by way of example and not limitation in FIG. 1, comprises a tie-down assembly 30 that includes a turnbuckle 32 and an attachment piece 34. Tie-down assembly 30 is configured to cooperate with connecting assembly 28. As depicted, turnbuckle 32 spans substantially the entire distance between camper 16 and bracket 26. Turnbuckle 32 has a first end 36 and a second end 38. One embodiment of first end 36 is illustrated in FIG. 1 as an eyelet that is configured to cooperate with a hook attached to camper 16. Various other types of cooperating connectors could be used to perform the function thereof equally effectively. What is important is that first end 36 of turnbuckle 32 is configured to be attached to camper 16.

Second end 38 of turnbuckle 32 is connected to attachment piece 34. Attachment piece 34 is held against truck skin 42 by connecting assembly 28 of anchor device 24 and will be discussed in further detail below. Various embodiments of tie-down means for interconnecting camper body 16 with bracket 26 are equally effective in carrying out the intended function thereof. For example, rather than turnbuckle 32 and attachment piece 34, tie-down assembly 30 can comprise a chain, a cable, strap, a belt or another elongated member used in combination with connectors such as j-hooks or other shapes of hooks or connectors. The specific embodiment of tie-down assembly 30 is not critical to the present invention. What is important, however, is that tie-down assembly 30 be configured to cooperate with connecting assembly 28.

Figure 2:
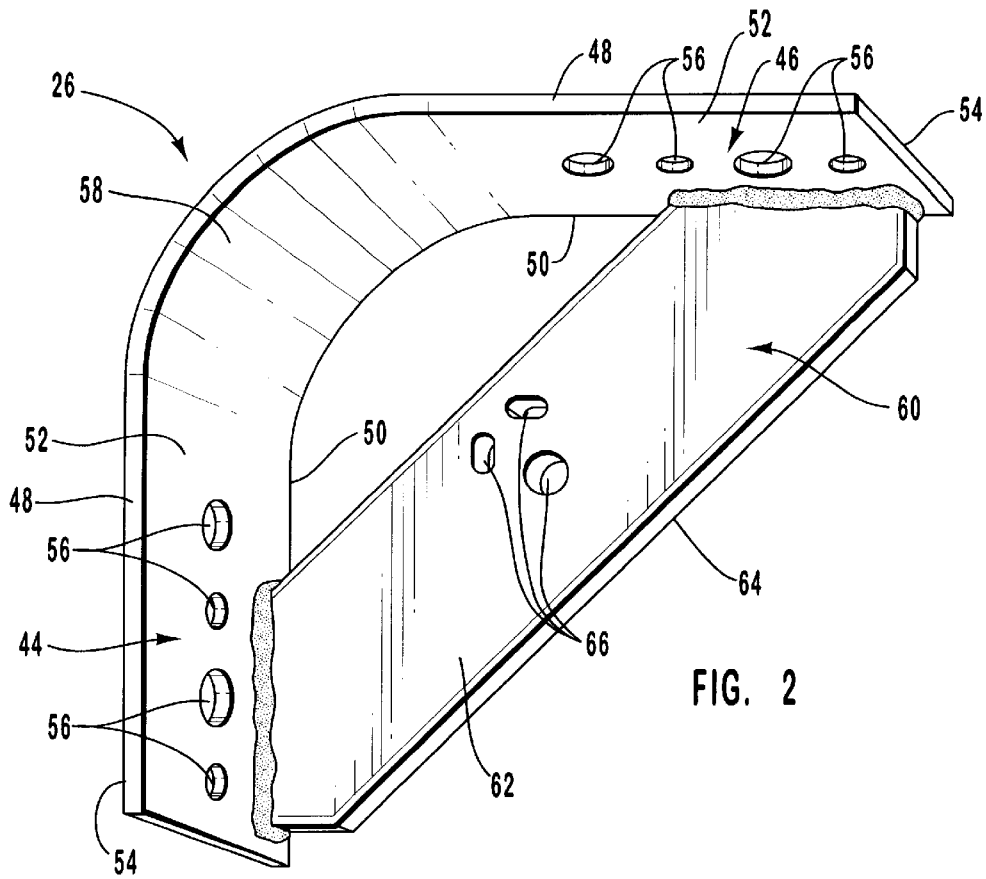
FIG. 2 is a perspective view of the bracket of the anchor device of FIG. 1.

One embodiment of bracket 26 is illustrated in FIG. 2 and comprises a first arm 44 and a second arm 46. First arm 44 and second arm 46 each have an inner edge 48 and outer edge 50. In the embodiment depicted in FIG. 2, outer edges 50 of first arm 44 and second arm 46 lie in substantially the same plane. It can be appreciated that outer edges 50 of first arm 44 and second arm 46 could be configured so at to not be co-planar without affecting the function thereof. First arm 44 and second arm 46 also have an inner surface 52, an outer surface 54, and at least one aperture 56. One embodiment of first arm 44 and second arm 46 are substantially flat. First arm 44 and second arm 46 could, however, have various other configurations. First arm 44 and second arm 46 are connected by a corner portion 58. In a presently preferred embodiment of bracket 26, first arm 44 and second arm 46 are connected to corner portion 58 so as to be substantially perpendicular to each other. In the embodiment illustrated, corner portion 58 is rounded and first arm 44 is connected to second arm 46 by corner portion 58 so as to have a generally elbow-shaped profile.

It can be appreciated that corner portion 58 may have various other configurations. For example, corner portion 58 can have a right-angled profile or have other angular relationships with first arm 44 and second arm 46, such as by way of example and not limitation, 45 degrees. In addition, corner portion 58 is not required to have the same angular relationship with both first arm 44 and second arm 46. By way of example and not limitation, corner portion 58 could have an angular relationship with first arm 44 of sixty (60) degrees while having an angular relationship of thirty (30) degrees with second arm 46 or visa versa. Various embodiments of corner portion 58 are equally effective in carrying out the intended function thereof.

In the embodiments discussed above, first arm 44 and second arm 46 are substantially perpendicular. In the alternative, however, first arm 44 and second arm 46 may not be perpendicular. In those cases, corner portion 58 might be pointed like the end of a triangle with first arm 44 and second arm 46 having some angular relationship to each other that is different than 90 degrees. Various angular relationships of first arm 44 and second arm 46 to each other that are connected by corner portion 58 are equally effective in carrying out the intended function thereof.

In the embodiment depicted in FIG. 2, bracket 26 is made from a single piece of material that has been formed to create first arm 44, second arm 46, and corner portion 58. It is contemplated that first arm 44, second arm 46, and corner portion 58 can alternatively be discrete members that are joined to form one piece by conventional attaching methods such as welds or adhesives. The various embodiments of first arm 44, second arm 46, and corner portion 58 are equally capable of carrying out the intended function thereof with equal effectiveness.

According to one aspect of the present invention, bracket 26 also comprises a reinforcing means for providing strength and rigidity to bracket 26. One embodiment of structure capable of performing the function of such a reinforcing means comprises a cross member 60. Cross member 60 has an inside surface 62, an outside surface 64, and at least one opening 66 formed therethrough. Cross member 60 is configured to provide strength and rigidity to bracket 26. Cross member 60 also prevents rotational movement of bracket 26 and anchor device 24. One embodiment of cross member 60 is substantially flat. Cross member 60 could, however, have various other configurations.

In one embodiment of bracket 26 depicted in FIG. 2, cross member 60 is attached to inner surfaces 52 of first arm 44 and second arm 46 such that outside surface 64 of cross member 60 is in the same plane as the plane defined by outer edges 50 of first arm 44 and second arm 46. As depicted in FIG. 2, in one presently preferred embodiment of bracket 26, first arm 44, second arm 46, corner portion 58, and cross member 60 form a generally triangular-shaped bracket 26. It is to be understood, however, that bracket 26 may have any form, known to one skilled in the art, to give sufficient strength and rigidity to allow camper 16 to be coupled to truck bed 14 through bracket 26.

In an alternate embodiment, cross member 60 is attached anywhere on inner surfaces 52 of first arm 44 and second arm 46 such that the longitudinal axis of cross member 60 is substantially parallel with the plane defined by outer edges 50 of first arm 44 and second arm 46. In addition, in another embodiment, inside surface 62 of cross member 60 can be attached directly to outer edges 50 of first arm 44 and second arm 46. In this embodiment, cross member 60 is also substantially parallel to the plane defined by outer edges 50 of first arm 44 and second arm 46. In yet another alternate embodiment, cross member 60 has a generally L-shaped cross section with two tongues attached at each end of cross member 60. The tongues of cross member 60 are coupled to inner surfaces 52 of first arm 44 and second arm 46. Various embodiments of the reinforcing means for providing strength and rigidity to bracket 26 are equally effective in carrying out the intended function thereof.

Bracket 26 is preferably composed of materials selected from the group consisting of steel, plastic, aluminum, metallic alloys or other similar materials which will provide sufficient strength and rigidity to allow camper 16 to be coupled to truck bed 14. It is preferred that bracket 26 be substantially composed of steel or an alloy thereof.

Figure 3:
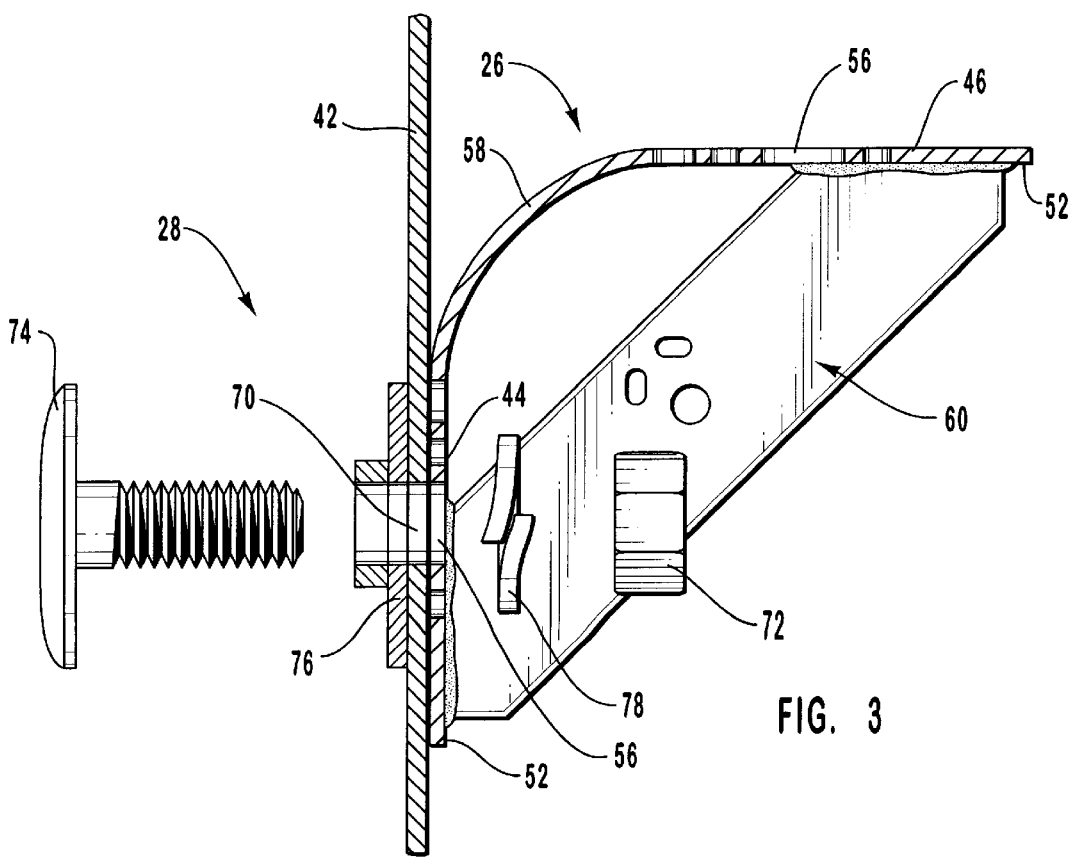
FIG. 3 a partial exploded cross-sectional side view of the anchor device of FIG. 1.
Figure 4:
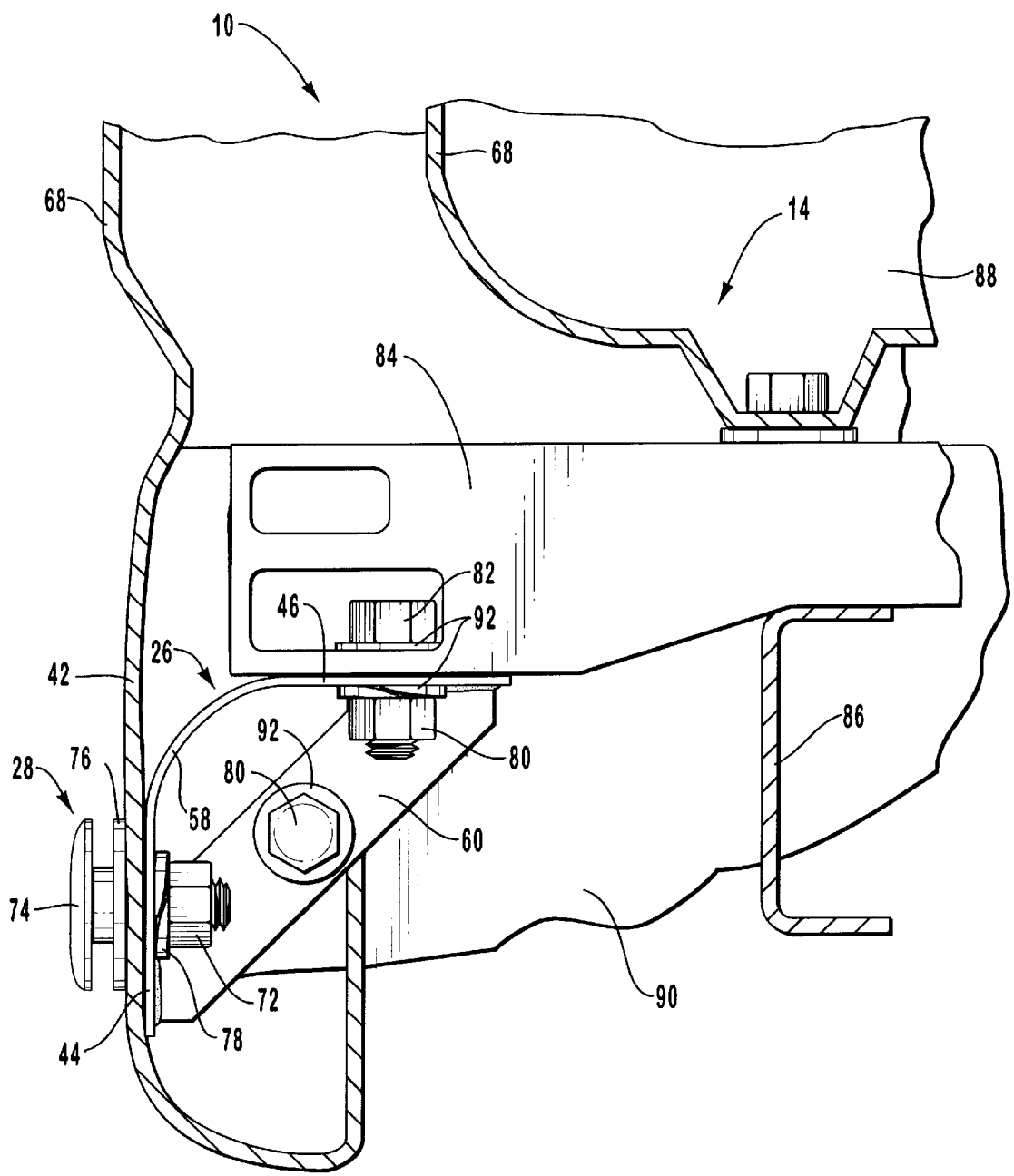
FIG. 4 is a partial cross-sectional side view of the anchor device of FIG. 1 attached to a truck.

As shown generally in FIG. 1, bracket 26 is configured to be mounted below the horizontal planar level of truck bed 14 and to be mounted on three substantially perpendicular surfaces of truck 10 so as to limit any rotational, horizontal and vertical movement of camper 16. Referring now to FIG. 4, bracket 26 is shown as being mounted to truck 10 below the horizontal planar level of truck bed 14. According to one aspect of the present invention, anchor device 24 is provided with connecting means for coupling bracket 26 to truck bed 14. One example of structure capable of performing the function of such a connecting means is illustrated in FIGS. 3 and 4 and includes connecting assembly 28 which comprises a nut 72, a flat headed bolt 74, a step washer 76, and a washer 78. Connecting assembly 28 also comprises nuts 80 and bolts 82 shown in FIG. 4.

Referring to FIGS. 3 and 4, first arm 44 of bracket 26 is attached to the inside surface of truck skin 42 which extends below side wall 68 of truck bed 14. Truck bed 14 is defined by side wall 68 and a front wall 88. As shown in FIGS. 2–4, flat headed bolt 74 is disposed in orifice 70 formed in truck skin 42 and aperture 56 of first arm 44. Nut 72 is connected to the end of flat headed bolt 74. Connecting assembly includes an optional step washer 76 that is positioned between flat headed bolt 74 and the outside surface of truck skin 42 and an optional washer 78 that is between the inner surface 52 of first arm 44 and nut 72. As shown in FIGS. 1–4, attachment piece 34 of tie-down assembly 30 is positioned between the head of flat headed bolt 74 and optional step washer 76. If step washer 76 is not used, attachment piece 34 is positioned between the head of flat headed bolt 74 and truck skin 42. Likewise, if washer 78 is not used, nut 72 contact inner surface 52 of first arm 44.

It is to be understood that this figure represents one side of truck 10 and that bracket 26 is merely rotated to be mounted on the opposite side of truck 10. In that case, second arm 46 of bracket 26 is against truck skin 42. The remainder of the discussion about attaching bracket 26 to truck 10 is substantially the same.

As depicted in FIG. 4, second arm 46 of bracket 26 is connected to a horizontal surface of a cross frame 84 that is also coupled to a truck frame 86. Generally, cross frame 84 is substantially perpendicular to truck bed 14. In addition, cross frame 84 is substantially parallel to the front wall 88 of truck bed 14 and is in close proximity to the back wall of cab 12. Second arm 46 is attached to cross frame 84 using nut 80 and bolt 82. Bolt 82 is disposed in an opening formed in cross frame 84 that is configured to cooperate with bolt 82. Bolt 82 is also disposed in aperture 56 formed in second arm 46. FIG. 4 depicts optional washers 92 that are disposed between bolt 82 and cross frame 84 as well as between nut 80 and inner surface 52 of second arm 46. In an alternate embodiment, where the horizontal surface of cross frame 84 is not available or is not in the needed position, second arm 46 can be connected directly to the underside of the horizontal surface of truck bed 14.

Bracket 26 may be attached to cross frame 84, truck skin 42 and a vertical support 90 which may be, by way of example and not limitation, the back wall of cab 12, front wall 88 of truck bed 14, or the vertical side of cross frame 84. In one embodiment illustrated in FIG. 4, vertical surface 90 is front wall 88 of truck bed 14 which extends below the horizontal planar level of truck bed 14. As shown in FIG. 4, cross member 60 is attached to vertical surface 90, which in this case is front wall 88, by nuts 80 and bolts 82 in a similar manner as second arm 46 was attached to cross frame 84. Likewise, optional washers 92 may also be used.

In an alternate embodiment, cross member 60 is attached to the back wall of cab 12 where the distance between truck bed 14 and the back wall of cab 12 is fairly small. Alternatively, cross member 60 could be attached to the vertical surface of cross frame 84.

In one embodiment, cross frame 26, truck skin 42 and vertical support 90 are configured to cooperate with connecting means for connecting bracket 26 to truck bed 14. In general, bracket 26 may be connected to any three surfaces, below the horizontal planar level of truck bed 14. This will allow for varying positions of cross frame 84 with respect to cab 12, depending on the type of truck upon which bracket 26 is to be attached.

Other embodiments of connecting assembly 28 are contemplated. It is contemplated that instead of flat headed bolt 74 and bolts 82, connecting assembly 28 can use only one type of bolt. The only requirement is that the head on the bolt that is connected to attachment piece 34 of tie-down assembly 30 must be sufficiently large to keep attachment piece 34 in place. In addition, instead of using nuts and bolts, bracket 26 could be attached to truck 10 using conventional attachment methods, such as riveting, screwing, bonding, gluing, welding. It can be appreciated by one skilled in the art that different connecting assemblies may require all, none or some of the apertures or orifices to allow bracket 26 to be coupled to truck 10. For example, first arm 44 can be attached to truck 10 as previously discussed. Second arm 46 and cross member 60 can be attached to truck 10 by welding. In addition, it will be appreciated that various combinations of connectors can be used. Various embodiments of the connecting means for connecting the anchor device 24 to the truck 10 are equally effective in carrying out the intended function.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An anchor device for securing a camper in a bed of a truck, said anchor device comprising:
   (a) a bracket attached to the truck, said bracket being configured to be mounted below the horizontal planar level of the bed of the truck, said bracket further being configured to be mounted to three generally adjacent surfaces of the truck so as to limit any rotational, horizontal, and vertical movement of the camper;
   (b) connecting means for coupling said bracket to the truck; and
   (c) tie-down means for interconnecting the camper with said bracket.

2. An anchor device as defined in claim 1, wherein said bracket has a generally triangular configuration.

3. An anchor device as defined in claim 1, wherein said bracket comprises:
   (a) a first arm and a second arm connected by a corner portion, said first arm and said second arm each having an inner edge and an outer edge; and
   (b) reinforcing means for providing strength and rigidity to said bracket.

4. An anchor device as defined in claim 3, wherein said first arm, said second arm, and said corner portion of said bracket are connected so as to have a generally elbow-shaped profile.

5. An anchor device as defined in claim 3, wherein said reinforcing means comprises a cross member having an outside surface, said cross member being attached to said first arm and said second arm such that said cross member lies in a plane substantially parallel to a plane defined by said outer edges of said first arm and said second arm of said bracket.

6. An anchor device as defined in claim 3, wherein at least one of said first arm and said second arm of said bracket has an aperture formed therein configured to receive said connecting means therethrough.

7. An anchor device as defined in claim 1, wherein said tie-down means comprises an elongated turnbuckle having a first end attached to the camper and a second end configured to cooperate with said connecting means.

8. An anchor device as defined in claim 1, wherein said tie-down means comprises at least one j-hook and a chain that are attached to the camper and are configured to cooperate with said connecting means.

9. An anchor device as defined in claim 1, wherein the truck comprises a cross frame, a truck skin and a vertical support, said bracket being coupled to the truck skin and at least one of said cross frame and said vertical support.

10. An anchor device for securing a camper in a bed of a truck, said anchor device comprising:
  (a) a bracket configured to be mounted to three generally adjacent surfaces of the truck below the horizontal planar level of the bed of the truck and to stably retain the camper in the bed of the truck while limiting any rotational, horizontal and vertical movement of the camper, said bracket comprising:
    (i) a first arm and a second arm connected by a corner portion, said first arm, said second arm, and said corner portion being connected so as to have a generally elbow-shaped profile, said first arm and said second arm each having an inner edge and outer edge; and
    (ii) reinforcing means for providing strength and rigidity to said bracket;
  (b) connecting means for coupling said bracket to the truck; and
  (c) tie-down means for interconnecting the camper with said bracket, said tie-down means being configured to cooperate with said connecting means.

11. An anchor device as defined in claim 10, wherein said reinforcing means comprises a cross member having an outside surface, said cross member being attached to said first arm and said second arm such that said outside surface of said cross member lies in a plane substantially parallel to a plane defined by said outer edges of said first arm and said second arm.

12. An anchor device as defined in claim 11, wherein said first arm, said second arm, and said cross member are configured to be mounted on three surfaces of the truck so as to limit any rotational, horizontal and vertical movement of the camper.

13. An anchor device as defined in claim 12, wherein:
  (a) said truck comprises a cross frame and a truck skin;
  (b) one of said first arm and said second arm of said bracket is attached to said truck skin and is configured to receive said connecting means therethrough; and
  (c) the other of said first arm and said second arm of said bracket is attached to one of said cross frame and the bottom surface of the bed of the truck.

14. An anchor device as defined in claim 13, wherein said connecting means comprises a bolt and a nut.

15. An anchor device as defined in claim 10, wherein said tie-down means comprises:
  (a) an elongated turnbuckle having a first end attached to the camper and a second end; and
  (b) an attachment piece connected to said second end of said turnbuckle, said attachment piece being configured to cooperate with said connecting means.

16. An anchor device for securing a camper to a bed of a truck, said anchor device comprising:
  (a) a substantially triangular-shaped bracket configured to be mounted below the horizontal planar level of the bed of the truck, said bracket being configured to be mounted on three substantially perpendicular surfaces of the truck so as to limit any rotational, horizontal and vertical movement of the camper, said bracket comprising:
    (i) a first arm and a second arm connected by a corner portion such that said first arm and said second arm are substantially perpendicular, said first arm and said second arm each having an inner edge and an outer edge, one of said first arm and said second arm of said bracket having an aperture formed therein; and
    (ii) a cross member attached to said first arm and said second arm, said cross member having an inside surface and an outside surface,
  (b) a connecting assembly configured to couple said bracket to the bed of the truck, said connecting assembly comprises a bolt disposed in said aperture in one of said first arm or said second arm of said bracket; and
  (c) a tie-down assembly configured to interconnect the camper with said bracket, said tie-down assembly comprises:
    (i) an elongated turnbuckle having a first end attached to the camper and a second end; and
    (ii) an attachment piece connected to said second end of said turnbuckle, said attachment piece having an aperture formed therein through which said bolt is disposed.

17. An anchor device as defined in claim 16, wherein said cross member is attached to said first arm and said second arm such that said outside surface of said cross member and said outer edges of said first arm and said second arm lie in substantially the same vertical plane.

18. An anchor device as defined in claim 16, wherein the truck comprises a cross frame, a truck skin and a vertical support, said truck skin having an orifice formed therethrough in which said bolt is disposed.

19. An anchor device as defined in claim 16, wherein said connecting assembly further comprising a step washer, a washer, and a nut.

20. An anchor device as defined in claim 16, wherein said first arm and said second arm of said bracket both have an aperture formed therein configured to cooperate with said connecting assembly.

21. An anchor device as defined in claim 18, wherein
  (a) one of said first arm and said second arm of said bracket is attached to said cross frame; and
  (b) said cross member is attached to said vertical support of the truck.

22. A device as defined in claim 21, wherein said vertical support comprises one of a cab wall and a lower protruding portion of a front wall of the bed of the truck.

23. A device as defined in claim 16, wherein said bracket is substantially composed of material selected from the group consisting of steel, steel alloys, aluminum, aluminum alloys and plastic materials.

24. An anchor device for securing a camper in a bed of a truck, said anchor device comprising:
  (a) a bracket attached to the truck, said bracket being configured to be mounted below the horizontal planar level of the bed of the truck, said bracket further being configured to be mounted to three surfaces of the truck so as to limit any rotational, horizontal, and vertical movement of the camper, wherein said bracket comprises
  (i) a first arm and a second arm connected by a corner portion, said first arm and said second arm each having an inner edge and an outer edge; and
  (ii) a cross member having an outside surface, said cross member being attached to said first arm and said second arm such that said cross member lies in a plane substantially parallel to a plane defined by said outer edges of said first arm and said second arm of said bracket;
(b) connecting means for coupling said bracket to the truck; and
(c) tie-down means for interconnecting the camper with said bracket.

25. An anchor device for securing a camper in a bed of a truck, said anchor device comprising:

(a) a bracket attached to the truck,
  said bracket being configured to be mounted below the horizontal planar level of the bed of the truck, said bracket further being configured to be mounted to three surfaces of the truck so as to limit any rotational, horizontal, and vertical movement of the camper;
  (i) connecting means for coupling said bracket to the truck; and
  (ii) tie-down means for interconnecting the camper with said bracket,
(b) wherein the truck comprises a cross frame, a truck skin and a vertical support, said bracket being coupled to the truck skin and at least one of said cross frame and said vertical support.

* * * * *

UNITED STATES PATENT AND TRADEMARK OFFICE
CERTIFICATE OF CORRECTION

PATENT NO.     : 6,145,920
DATED          : November 14, 2000
INVENTOR(S)    : C. Martin Rasmussen It is certified that error appears in the above-identified patent and that said Letters Patent is hereby corrected as shown below:

<u>Title page,</u>
Item [73], Assignee, after "Happijac" change "Corporation" to -- Company --
Item [57], ABSTRACT,
Line 3, before "that includes" delete "is"

<u>Column 1,</u>
Line 18, before "conquer" insert -- to --
Line 20, after "protect" change "themselves" to -- himself --
Line 21, after "shelter with" change "them" to -- him --
Line 23, before ", but also" change "themselves" to -- himself --
Line 25, after "rope, vines" insert -- , -- (comma)

<u>Column 2,</u>
Line 1, after "threaded" change "hole" to -- holes --
Line 2, before "rear wall" insert -- the --
Line 11, after "These" change "type" to -- types --
Line 18, after "and/or" change "connect" to -- connects --
Line 53, after "wall and" change "encloses" to -- enclose --

<u>Column 3,</u>
Line 3, before "safe, secure" change "is" to -- are --
Line 26, after "invention" insert -- is --

<u>Column 4,</u>
Line 37, before "a partial" insert -- is --

<u>Column 5,</u>
Line 21, after "a cable," insert -- a --
Line 34, after "configured so" change "at" to -- as --
Line 38, before "substantially flat" change "are" to -- is --

<u>Column 7,</u>
Line 26, before "inner surface" change "contact" to -- contacts --

<u>Column 8,</u>
Line 7, after "assembly 28" change "arc" to -- are --
Line 14, after "gluing," insert -- or --

UNITED STATES PATENT AND TRADEMARK OFFICE
CERTIFICATE OF CORRECTION

PATENT NO.   : 6,145,920
DATED        : November 14, 2000
INVENTOR(S)  : C. Martin Rasmussen It is certified that error appears in the above-identified patent and that said Letters Patent is hereby corrected as shown below:

Column 11,
Lines 2-3, after "bracket comprises" insert -- : -- (colon)

Column 12,
Line 8, before "connecting" change "(i)" to -- (b) --
Line 10, before "tie-down" change "(ii)" to -- (c) --
Line 12, before "wherein" delete "(b)"

Signed and Sealed this

Thirteenth Day of August, 2002

Attest:

JAMES E. ROGAN
Attesting Officer   Director of the United States Patent and Trademark Office